United States Patent
Kirkby et al.

(10) Patent No.: US 10,891,632 B2
(45) Date of Patent: Jan. 12, 2021

(54) ONLINE AD DETECTION AND AD CAMPAIGN ANALYSIS

(71) Applicant: Accenture Global Services Limited, Dublin (IE)

(72) Inventors: Stephen Denis Kirkby, Unley (AU); Peter Kellett, Kilburn (AU); Matthew Figg, Campbell (AU); Jarred Holman, Wynn Vale (AU)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 296 days.

(21) Appl. No.: 15/806,091

(22) Filed: Nov. 7, 2017

(65) Prior Publication Data

US 2018/0060882 A1 Mar. 1, 2018

Related U.S. Application Data

(63) Continuation of application No. 13/768,915, filed on Feb. 15, 2013, now Pat. No. 9,842,339, which is a continuation of application No. 12/396,645, filed on Mar. 3, 2009, now Pat. No. 8,386,314.

(60) Provisional application No. 61/121,765, filed on Dec. 11, 2008.

(51) Int. Cl.
G06Q 30/02 (2012.01)
G06Q 10/10 (2012.01)

(52) U.S. Cl.
CPC ............ *G06Q 30/02* (2013.01); *G06Q 10/10* (2013.01); *G06Q 30/0242* (2013.01); *G06Q 30/0275* (2013.01)

(58) Field of Classification Search
CPC ............... G06Q 30/02; G06Q 30/0242; G06Q 30/0275; G06Q 10/10; G06Q 30/0277; G06Q 30/0251
See application file for complete search history.

(56) References Cited

U.S. PATENT DOCUMENTS

| 6,981,224 B1 | 12/2005 | Gardner et al. |
| 7,308,643 B1 * | 12/2007 | Zhu .......................... G06F 16/94 715/206 |
| 2002/0004733 A1 | 1/2002 | Addante |
| 2002/0099695 A1 | 7/2002 | Abajian et al. |
| 2004/0078294 A1 | 4/2004 | Rollins et al. |
| 2004/0098493 A1 | 5/2004 | Rees |

(Continued)

FOREIGN PATENT DOCUMENTS

| CN | 102033881 | 4/2011 |
| CN | 102591983 | 7/2012 |

(Continued)

OTHER PUBLICATIONS

"An Analysis of Visual and Presentation Factors Influencing the Design of E-Commerce Web Sites" Published Dec. 1, 2008 Authors: Banatus Soiraya, Anirach Mingkhwan, Choochart Haruechaiyasak.*

(Continued)

*Primary Examiner* — Victoria E Frunzi
(74) *Attorney, Agent, or Firm* — Mannava & Kang, P.C.

(57) ABSTRACT

Metrics for online ads are captured by parsing web pages to identify ad beacons containing information identifying whether the online ads are for a particular client. These metrics are used to determine key performance indicators for auditing and competitor analysis for an online ad campaign.

20 Claims, 8 Drawing Sheets

(56) References Cited

U.S. PATENT DOCUMENTS

| | | | |
|---|---|---|---|
| 2004/0133471 A1* | 7/2004 | Pisaris-Henderson | G06Q 30/02 705/14.41 |
| 2004/0227768 A1 | 11/2004 | Bates et al. | |
| 2005/0021397 A1 | 1/2005 | Cui et al. | |
| 2005/0021862 A1 | 1/2005 | Schroeder et al. | |
| 2005/0055275 A1 | 3/2005 | Newman | |
| 2005/0137939 A1* | 6/2005 | Calabria | G06Q 30/02 705/26.1 |
| 2005/0209919 A1 | 9/2005 | Stubbs et al. | |
| 2006/0224965 A1* | 10/2006 | Bodin | G06Q 10/10 715/730 |
| 2006/0253583 A1 | 11/2006 | Dixon et al. | |
| 2007/0112960 A1 | 5/2007 | Joy et al. | |
| 2007/0239532 A1* | 10/2007 | Benson | G06Q 30/02 705/14.45 |
| 2007/0282829 A1 | 12/2007 | Fontoura et al. | |
| 2007/0294401 A1 | 12/2007 | Shkedi | |
| 2008/0065630 A1 | 3/2008 | Luo et al. | |
| 2008/0086368 A1 | 4/2008 | Bauman et al. | |
| 2008/0091516 A1* | 4/2008 | Giunta | G06Q 30/0204 705/14.42 |
| 2008/0114624 A1 | 5/2008 | Kitts | |
| 2008/0140502 A1 | 6/2008 | Dirnholz et al. | |
| 2008/0201733 A1 | 8/2008 | Ertugrul et al. | |
| 2008/0250446 A1 | 10/2008 | Zigmond et al. | |
| 2008/0270363 A1 | 10/2008 | Hunt et al. | |
| 2008/0301574 A1 | 12/2008 | Sanghvi et al. | |
| 2009/0132340 A1* | 5/2009 | Demir | G06Q 30/0246 705/7.29 |
| 2009/0197582 A1 | 8/2009 | Lewis et al. | |
| 2009/0240677 A1* | 9/2009 | Parekh | G06F 16/9535 |
| 2009/0257620 A1 | 10/2009 | Hicks | |
| 2009/0284530 A1 | 11/2009 | Lester | |
| 2009/0307081 A1 | 12/2009 | Rabbitt | |
| 2010/0076954 A1 | 3/2010 | Dulitz et al. | |
| 2010/0153217 A1 | 6/2010 | Kirkby et al. | |
| 2010/0235219 A1 | 9/2010 | Merrick et al. | |
| 2010/0241498 A1 | 9/2010 | Chung | |
| 2010/0257022 A1 | 10/2010 | Wang et al. | |
| 2011/0035273 A1 | 2/2011 | Parikh et al. | |
| 2011/0125587 A1* | 5/2011 | Netzer | G06Q 30/02 705/14.68 |
| 2012/0173552 A1 | 7/2012 | Zhu et al. | |

FOREIGN PATENT DOCUMENTS

| | | |
|---|---|---|
| EP | 2270736 | 1/2011 |
| JP | 2001188703 | 7/2001 |
| JP | 2002049553 | 2/2002 |
| JP | 2008269045 | 11/2008 |
| KR | 2008-0000810 | 1/2008 |
| KR | 20080048790 | 6/2008 |
| WO | 2008/002031 | 1/2008 |

OTHER PUBLICATIONS

Lipinski, Mike, "M86 Secure Web Gateway v10.1", SC Magazine vol. 23, issue 3, p. 41, Mar. 2012, 3 pages.

"Patent Examination Report No. 1" on Australia Patent Application No. 2013205416, dated May 9, 2014, 5 pages.

Duriau, Vincent J., et al., "A Content Analysis of the Content Analysis Literature in Organization Studies: Research Themes, Data Sources, and Methodological Refinements", pp. 5-34, Jan. 2007.

Chen, Rui, et al., "Cindi Robot: an Intelligent Web Crawler Based on Multi-level Inspection", Database Engineering and Applications Symposium, 2007, Ideas 2007, 11th International, IEEE, Piscataway, NJ, USA, Sep. 1, 2007, pp. 93-101, XP025080344.

Bun, Khoo Khyou, et al., "Emerging topic tracking system in WWW", Knowledge-based systems, Elsevier, vol. 19, No. 3, Jul. 1, 2006, pp. 164-171, XP025080344.

Martins, Bruno, et al., "The WebCAT Framework Automatic Generation of Meta-Data for Web Resources", Web Intelligence, 2005, Proceedings, the 2005 IEEE/WIC/ACM International AL Conference on Compiegne, France Sep. 19-22, 2005, pp. 236-242, XP010841644.

Krammer, Viktor, "An Effective Defense against Intrusive Web Advertising", Privacy, Security, and Trust, 2008, PST '08, Sixth Annual Conference On, IEEE, Piscataway, NJ, USA, Oct. 1, 2008, pp. 3-14.

"Parse JavaScript links in HTML", IBM corp., IP.com Inc, West Henrietta, NY, US, Sep. 24, 2003.

Brin, Sergey, et al., "The anatomy of a large-scale hypertextual Web search engine", Computer Networks and ISDN Systems, North Hollan Publishing, Amsterdam, NL, vol. 30, No. 1-7, Apr. 1, 1998, pp. 107-117.

"European Search Report", European Application No. 09012209.4, European Patent Office, Mar. 24, 2010.

"Notice of Reasons for Refusal" Japanese Application No. 2009-281229, Japanese Patent Office, dated Dec. 17, 2013.

"Extended European Search Report on EP Application No. 13004259.1", European Patent Office, dated Feb. 7, 2014, 5 pages.

"Patent Examination Report No. 1" on Australia Patent Application No. 2013221949, IP Australia, dated May 23, 2014, 6 pages.

Tess Trademark Search of Flash, downloaded on Nov. 13, 2015, 3 pages.

Tess Trademark Search of Java, downloaded on Nov. 13, 2015, 2 pages.

"First Examination Report", Indian Patent Application No. 2414/MUM/2009, India Patent Office, dated Dec. 14, 2015, 2 pages.

"Notification of Reason for Refusal", Korean Patent Application No. KR-10-2009-0118182, dated Apr. 8, 2016, 11 pages.

* cited by examiner

FIG. 5A

Maxamine Reports
http://www.accenture.reports/index.html
File  Edit  View  Favorites  Tools  Help accenture
Marketing Sciences

Reports
▼ Trackability
  ○ Image
     Snapshot
     Summary
     Detail
▲ Issue
   Management

Advertising Image Snapshot Report

AdMAX

Advertising Image Snapshot (0.23%)
Lists all advertising images, pages that linked to them and the ALT text used at time of scan. (Expand)

Expand All

| | |
|---|---|
| Report Date: | May 1, 200X |
| % Unscanned: | 61.8% (8276 of 13393 objects) |
| Site: | abcd.com |
| File: | |
| Total Images: | 1720 |
| Total Pages: | 1451 |
| Total Pages with advertisements: | 1210 (83.39%) |
| Total Advertising clients: | 22 |

Scan Date: April 23, 200X

500

502 — Drill into each client ID to see ad type, page location, etc.

Client Summary — 503

| Client Id | Unique Ads | Covered Pages | % of site |
|---|---|---|---|
| 951243 | 6 | 430 | 29.63% |
| 742440 | 21 | 366 | 25.22% |
| 824281 | 2 | 113 | 7.79% |
| 533799 | 3 | 110 | 7.58% |
| 724446 | 7 | 78 | 5.38% |
| 842109 | 23 | 72 | 4.96% |
| 666472 | 7 | 71 | 4.89% |
| 164013 | 2 | 65 | 4.48% |
| 804171 | 59 | 58 | 4.00% |

FIG. 5C

All Campaigns for Client A
KPIs for Quarter 4, 2008

| | Cost | Pool | Vs Pool | Weight | Value |
|---|---|---|---|---|---|
| Cost | | | | | |
| CPM Buys | $ 0.00 | $ 4,900,000.00 | 100.00% | | -$ 4,900,000.00 |
| Fixed / Tenancy Buys | $ 0.00 | $ 130,000.00 | 100.00% | | -$ 130,000.00 |
| CPC Buys | $ 0.00 | | | | |
| CPA Buys | $ 0.00 | | | | |
| Ad Serving | $ 0.00 | $ 400,000.00 | 100.00% | | $ 400,000.00 |
| Cost Total | $ 0.00 | $ 5,430,000.00 | 100.00% | | -$ 5,430,000.00 |
| | Performance | Pool | Vs Pool | Weight | Value |
| Coverage | | | | | |
| % of Pages Covered | 1.61% | 15.00% | -13.39% | 0 | $ 0.00 |
| Distance from Home Page | 1.44% | 15.50% | -14.05% | 0 | $ 0.00 |
| Searchability | 1.51% | 15.31% | -13.81% | 0 | $ 0.00 |
| Distance / Searchability | 1.69% | 14.83% | -13.14% | 12 | $ 0.00 |
| Reach | | | | 12 | |
| Targeting | | | | | |
| Demographic Affinity | | | | 12 | $ 0.00 |
| Context Relevance | | | | 12 | $ 0.00 |
| Attention | | | | | |
| Page Dominance Ad Space | 13.27% | 29.15% | -15.88% | 25 | $ 0.00 |
| Page Viewing Time | | | | 25 | $ 0.00 |
| Delivery over time | | | | | |
| cache Busting | 97.44% | 81.92% | -15.52% | 50 | $ 0.00 |
| Click Through Works | 99.12% | 90.13% | 9.00% | 100 | $ 0.00 |
| Not Transmitted | 93.56% | 67.40% | 26.16% | 100 | $ 0.00 |
| Quality Total | | | | | $ 0.00 |
| TOTAL VALUE | | | | | -$ 5,430,000.00 |

520

ONLINE AD DETECTION AND AD CAMPAIGN ANALYSIS

PRIORITY

This application is a Continuation of commonly assigned and copending U.S. patent application Ser. No. 13/768,915, filed Feb. 15, 2013, which is a continuation of U.S. patent application Ser. No. 12/396,645, filed Mar. 3, 2009, now U.S. Pat. No. 8,386,314, issued Feb. 26, 2013, which claims priority to U.S. provisional patent application Ser. No. 61/121,765, filed Dec. 11, 2008, and entitled "Online Ad Detection and Ad Campaign Analysis", the disclosures of which are hereby incorporated by reference in their entireties.

BACKGROUND

Given the ubiquitous nature of the Internet, the Internet has become a common vehicle for purveyors of goods and services to reach new customers and generate new business. In particular, online advertising is a highly-popular, Internet-based tool used by businesses to achieve their objectives, such as to increase market share.

Online advertising typically includes posting advertisements (ads) on web sites. The ads may include a marketing message, and a user may be able to click on the ad, which typically takes the user to another web page for a product or service being marketed in the ad. Ads may be provided in many forms, such as text ads, image ads, banner ads, etc. A banner ad is an ad embedded in a web page and often includes text, images, video, sound or any combination of those elements.

Ads are usually purchased from an ad service or an ad network, referred to as ad vendors herein, in order to have the ad placed on a particular web site. For example, search engines typically offer ad services whereby an advertiser pays to have their ads posted on the search engine web site or other affiliated web sites. Different purchase plans are available. One common plan includes a pay-per-click model, which charges the advertiser every time a user clicks on the ad. Many web sites, in addition to search engines, offer online advertising. Some web sites require advertisers to bid for online advertising on their sites. For example, a highest bidder may be given a premium location on the web site for their ad, or may be given the option of restricting competitors from advertising on the web page.

Many businesses allocate a large portion of their marketing budget to online advertising. However, it can be difficult for a business to quantify the impact of their online advertising campaign. In a pay-per-click model, advertisers can determine how many users are clicking on their ads. Also, if the ad directs the user to a web page where products can be purchased, a business may be able to track whether a user that clicked on an ad also made a purchase. However, this type of analysis does not provide any indication of how an online advertising campaign can be improved. In addition, rudimentary analysis of determining whether a user clicked on ad does not provide a business with feedback on how to improve their online ad campaign over a competitor's online ad campaign. Furthermore, many businesses engage in sophisticated online advertising campaigns where they are competing against competitors for ad space and they are placing many ads across many web sites. It is difficult to track the web sites to determine whether the web sites are posting their ads, and whether the ads include the proper content and are provided in the proper web page and in the proper location on the web page.

BRIEF DESCRIPTION OF DRAWINGS

The embodiments of the invention will be described in detail in the following description with reference to the following figures.

FIGS. 5A-C illustrates examples of reports, according to embodiments; and

DETAILED DESCRIPTION OF EMBODIMENTS

Figure 1:
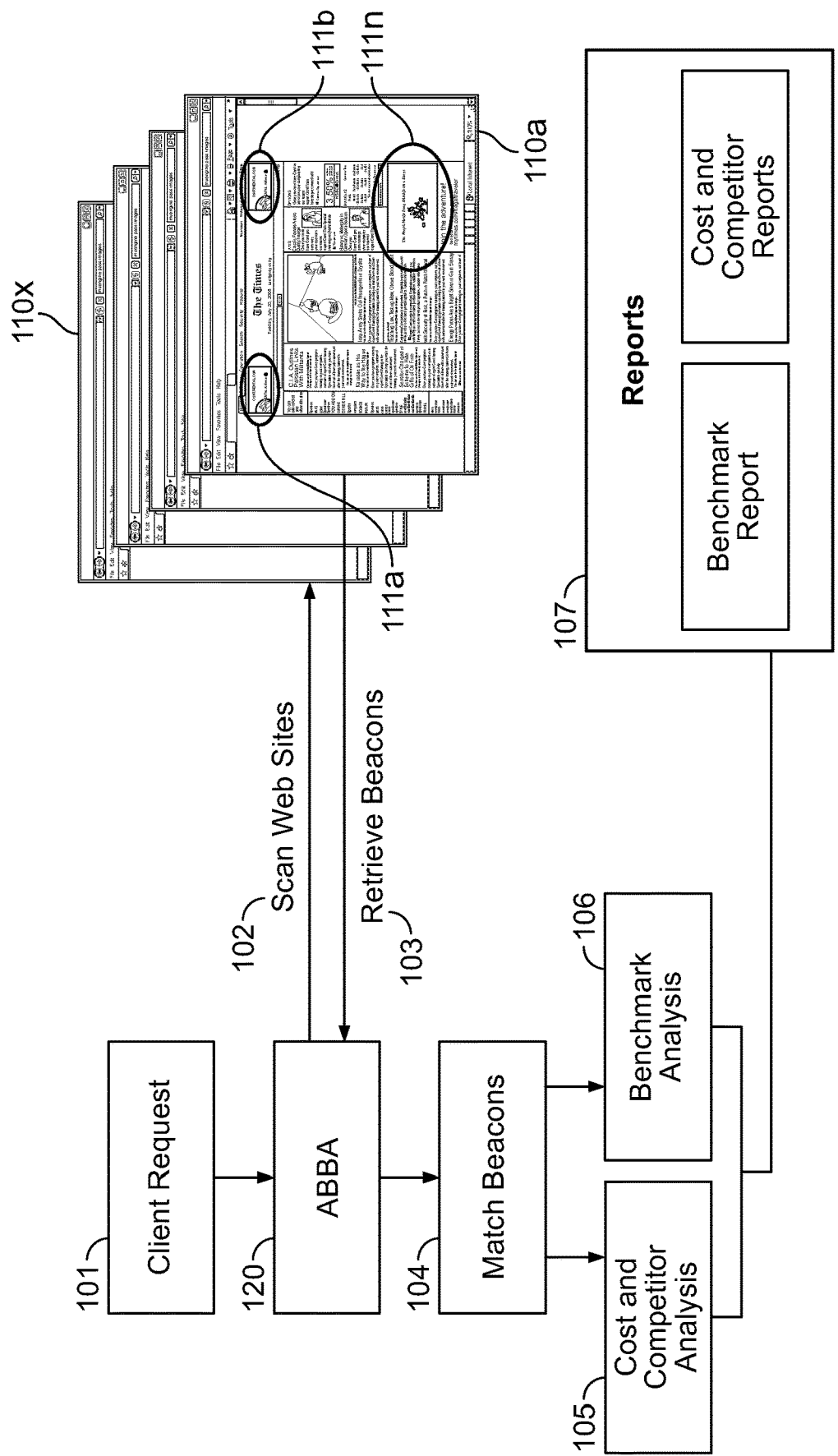
FIG. 1 illustrates a data flow diagram for a system, according to an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, an Ad Buyers Banner Audit (ABBA) system is configured to detect and identify online ads, and provide an audit service for the online ads. An online ad is a message provided on a web site. The message in the ad is typically a marketing message promoting products or services, which may be offered for sale. Many online ads can be clicked on by a user, which may take the user to the product web site or another web site promoting the product or service. Online ads may be provided in many forms, such as banner ads, pop-up ads, floating ads, etc.

ABBA is able to scan and detect online ads. In one embodiment, a scan server cloud is used to scan web sites dispersed over a wide geographic area. The scanning may be performed for a predetermined set of web sites, which are identified by a client, or for a much larger group of web sites, or for both a predetermined set and for a much larger group of web sites.

ABBA is able to determine metrics for online ads from the scanning. These metrics may also be key performance indicators (KPIs) or can be used to derive KPIs for auditing and competitor analysis. Categories of metrics and KPIs for online ads include but are not limited ad coverage, targeting, delivery quality, and cost. Coverage is associated with locations of a client's online ads and may be compared with a competitor's online ad coverage. Targeting is associated with whether the online ads are posted in locations lucrative to the ad or posted in predetermined locations. This may be web sites where purchasers of goods being advertised frequently access. Delivery quality is associated with the content of the online ads, and cost is associated with cost of having an online ad posted.

The metrics captured by ABBA may be used by a client, such as an ad buyer, to audit information about their ads posted on web sites. A client is a user having online ads. The user may be a person, company, or other entity. The client may request metrics be captured for their online ads and/or competitors' online ads. Examples of these metrics include: when the ad was presented (e.g., date and time); ad image (e.g., the actual image presented in the ad); frequency of the occurrence of an ad image in the scan (e.g., two occurrences in 3 scans) based on scan scheduling; hourly/daily detection of the image; where a page including the ad was presented (e.g., URL and page title); a site level hierarchy identifying where the page including the ad is located in the web site; ad location in the web page (e.g., function of the tile parameter being set by DOUBLECLICK); click through verification (e.g., checking to make sure the click through works); inappropriate content verifier (make sure ad does not appear next to inappropriate content or text); and ad matching, which includes checking to see which ad's are shown with other ads (e.g., is your competitor's ad being shown at the same time as your ad). Reports are generated for the client summarizing this information.

The metrics used for the audit service can be combined to derive one or more ad presence KPIs or other types of KPIs. For example, content proximity KPIs may be derived from the proximity of the client's ads to competitors' ads and from the proximity of the client's ads to in appropriate content. Cost analysis KPIs may be used to determine ad effectiveness versus cost. For example, the cost for clicked ads is compared to ads ignored to derive a KPI for ad effectiveness versus cost. A KPI related to cost per page versus site level may be determined from the location of an ad in a web page hierarchy and the cost of that ad. A depth versus breadth scan analysis may be performed to determine the most effective ads. A cost of proximity to potential negative influences (e.g. competitor ads, inappropriate content) may be determined. This may include determining the effectiveness of ads. Effectiveness may also be measured based on the cost of ad placement in a web site and where the ad is actually placed versus the planned or desired placement.

In addition to tracking online advertisements, ABBA provides an ad campaign analysis that includes competitor and benchmarking analysis. An ad campaign may include multiple ads placed on multiple web pages for a particular client. The ad campaign analysis identifies metrics for competitor's ads to determine who is advertising where and how often they are advertising. This information may be compared to the ad information for the client to determine where the client may additionally need to advertise or where the client may have too much advertising coverage.

For example, coverage, targeting and delivery metrics are used to determine whether a competitor is likely having better ad placement. For example, company A is a client (e.g., a user of the ABBA services). Company A is selling luxury sports cars. A web site widely popular with owners of luxury sports cars has ads for Company A. The web site has a hierarchy of web pages starting at the home page. ABBA determines that company A's competitor has an online ad on the home page, and that Company A's online ad is on a web page farther down in the hierarchy. ABBA also determines that company A's online ad is located in a bottom right corner of the web page, while another competitor's ad is located in the center, right side of the web page. Based on this analysis, company A may purchase an online ad on the home page in a location more likely to be viewed and accessed by a visitor to the web site. A cost analysis may also be performed. This may include an analysis of cost for clicked ad versus ignored ads per site.

Both the ad campaign analysis and audit service use the ad information captured during the ad scan phase performed by scan servers. An ABBA server running software provides the ad campaign analysis and audit services, and the user interface. Also, ABBA provides a user interface, for example, via a web page, that allows clients or other users to view reports, metrics, key performance indicators (KPIs), and other information. For example, a user can login to the ABBA web page to get audit reports specifying the metrics and KPIs for the audit service. Competitor ad benchmarking analysis and other reports may also be viewed and downloaded via the web page user interface.

FIG. 1 illustrates a high-level data flow diagram for ABBA 120. ABBA 120 receives a client request at 101. The client request may include a list of all the web sites in which the client's ads are supposed to be posted. The client request may also include the type of analysis desired. For example, the client may be interested in a competitor analysis, a cost analysis, or a benchmarking analysis. The competitor analysis evaluates the client's ad campaign relative to a predetermined set of competitors based on the metrics. The cost analysis evaluates the client's ad campaign effectiveness versus cost. The benchmark analysis may analyze the presence of the client's ads, such as whether they are delivered, whether the ads are in the proper page location and have the proper content, frequency of occurrence, such as number of ads posted on the web page or web site, uniqueness of images in ads, and trends.

At 102, ABBA 120 scans the Internet to capture metrics for the client's ad campaign. The scan may cover the set of web sites provided by the client or a larger search space. FIG. 1 shows web pages 110a-x, including ads 111a-n.

At 103, ABBA 120 retrieves a beacon for each ad and metrics for each ad. A beacon, also referred to as a web beacon, is code for a web page that is able to retrieve information from another server. For ads, the beacon retrieves an ad image. The beacon may be a unique identifier or include a unique identifier for the ad or client. The beacon may be coded in hyper text markup language (HTML), Java script, Flash, etc, and is identifiable by parsing the code of a web page.

At 104, ABBA 120 matches the beacons to stored beacons for the client, and stores metrics for any matches in a database. The effectiveness of the ad campaign can be determined from the metrics. For example, at 105 and 106, an ad campaign analysis is performed that may include a competitor analysis, a cost analysis, and/or a benchmarking analysis. At 107, reports are generated for the campaign analysis.

Figure 2:
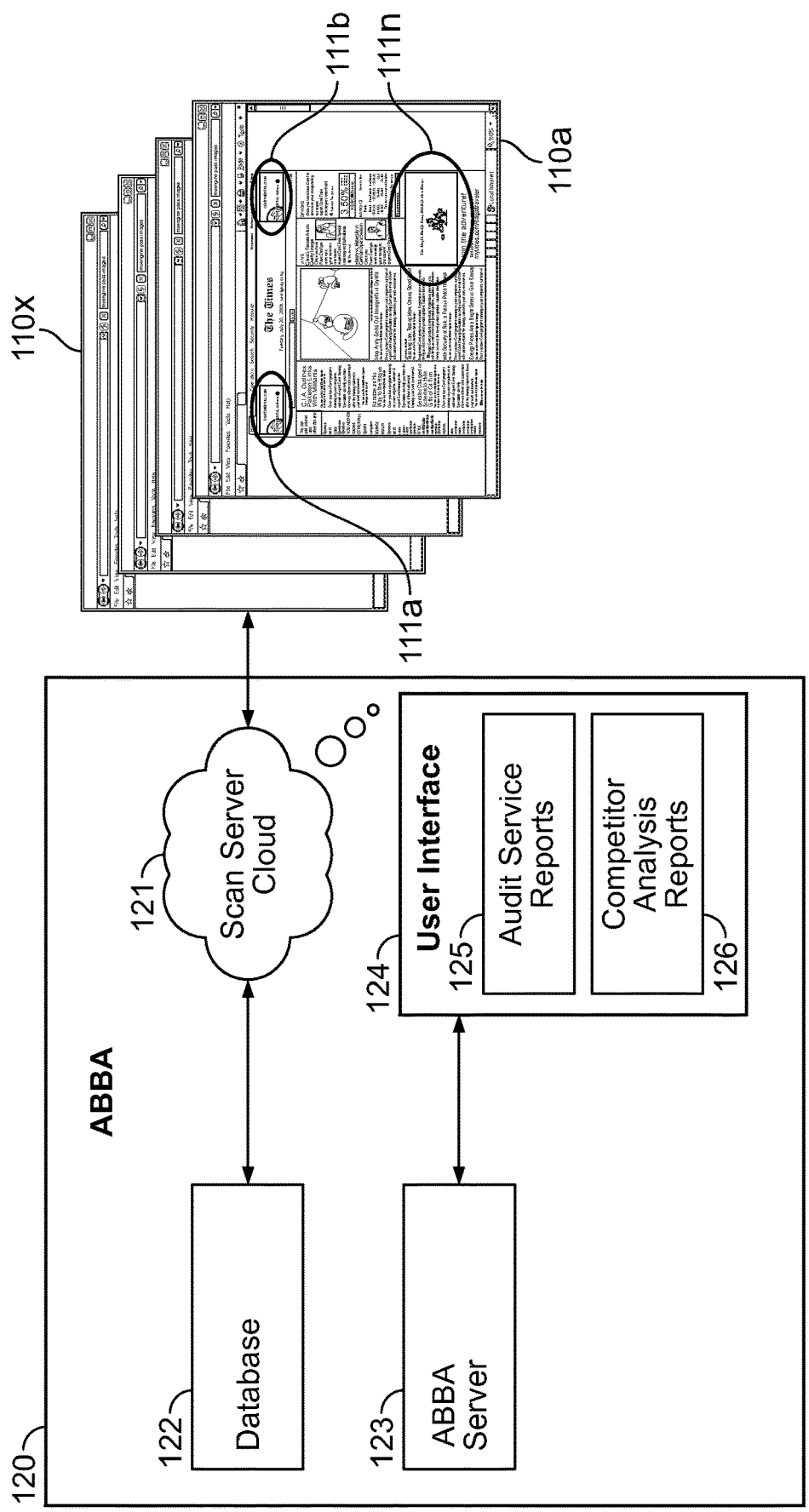
FIG. 2 illustrates a system diagram, according to an embodiment.

FIG. 2 illustrates a more detailed block diagram of ABBA 120. ABBA 120 includes a scan server cloud 121, a database 122, and ABBA server 123. The scan server cloud 121 includes multiple scan servers placed at different locations around the world to provide scalable website scanning and analysis. Each scan server scans a specific set of websites. For example, one scan server in the cloud 121 may be responsible for scanning web pages 110a-x which are geographically hosted near the scan server. Other servers scans other geographic areas. Together the server cloud covers all sites requested by the client for analysis. The database 122 stores banners, beacons, and website structure data, and ad metrics received from the scanning performed by the scan server cloud 121. The database 122 also stores client information, so the ad information determined from the scanning can be matched to the client information. For example, a client may be a car manufacturer. The database 122 stores a client ID for the car manufacturer, and information about their ads, such as beacons, so the retrieved beacons for scanned ads can be matched with the client's ads.

The ABBA server 123 receives and compiles the scanned ad information. This includes matching the scanned ad information and client information stored in the database 123. The matching associates the scanned ad information to the corresponding client. The ABBA server 123 also pre-calculates summary statistics and KPIs from gathered metrics to increase software responsiveness with large volumes of scan data. For example, the ABBA server 123 may determine KPIs for many clients and multiple clients may simultaneously require reporting. The ABBA server 123 may summarize metrics and KPIs prior to the client requesting the information. The KPIs, metrics and summaries may be stored in the database 122.

The ABBA server 123 also generates reports, including KPIs, which determine the effectiveness of ads relative to the content and web site. These reports are compiled from the attributes and metrics for the client's ads captured during the scan performed by the scan server cloud 121. This is shown as the audit service reports 125. The ABBA server 123 also generates competitor analysis reports 126. The ad campaign analysis identifies metrics for competitor's ads to generate the reports 126 of benchmarking statistics identifying which competitors are advertising and where and how often they are advertising.

A user interface 124 is also provided for presenting users or clients with the attributes, metrics, KPIs and reports generated by the ABBA server 123. The user interface 124 may be a graphical user interface (GUI) that allows users to dynamically search their advertising statistics and selects KPIs and reports for viewing. The user interface may be provided through a web page, where the user can login and view the desired information.

Figure 3:
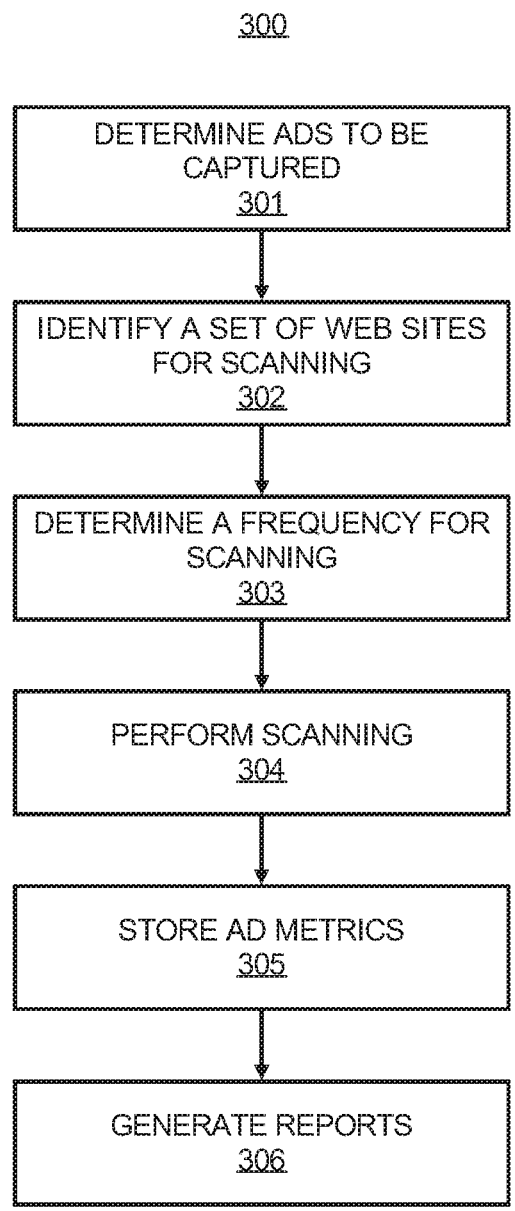
FIG. 3 illustrates a flow chart for scanning and report generation, according to an embodiment.

FIG. 3 illustrates a flow chart of a method for scanning web pages for ad information. The scan servers in the scan server cloud 121 shown in FIG. 2 may use this method to perform the scanning.

At step 301, ads to be captured by the scanning are determined. For example, a client may be a single company that needs to determine whether and where their ads are being posted. Thus, metrics for ads for the company are captured. In another example, the company may want ads for a particular product captured. Thus, metrics for ads for that particular product are captured. In another example, a client is an advertising vendor that provides a service of placing ads for its clients on several web sites. The advertising vendor identifies the ads for its clients to be captured by the scanning. In yet another example, a client may want ads for its competitors' captured. Then, a list of the competitors are provided by the client, and metrics for the competitors' ads are captured. In one embodiment, beacon IDs are determined for the clients which identify the ads to be captured during the scanning.

At step 302, a set of web sites are identified for scanning. A client may provide a list of web sites to be scanned. These may include web sites that are supposed to be posting the client's ads based on agreements (e.g., agreements between ad vendors and web site owners). Also, the client may provide a list of web sites that may be posting competitors' ads for the competitor analysis. Also, instead of using lists of web sites provided by the client or in addition to using the lists, a region-based or a more global-based scan can be performed.

At step 303, a frequency for scanning is determined. The scan frequency or interval may be determined to match the client's needs. For example, one client may require scans at short intervals, such as every 10 minutes for one hour, and repeated twice daily. This type of scan interval will capture a large sample set of all banner ads in web sites being scanned. Another client may not need short interval scans. For example, one or two scans daily may be performed to determine ad audit information. The scan server cloud 121 shown in FIG. 2 provides the flexibility to modify scan frequencies and areas or web sites to be scanned. The scan server cloud 121 is configured to receive requested scan frequencies and web site lists or scan regions for a client and retrieve ad information from the scans.

At step 304, scanning is performed, and at step 305 ad metrics are captured and stored. The scanning is performed for the web sites identified at step 302, and at the intervals determined at step 303. The ad metrics captured by the scanning are stored in the database 122 shown in FIG. 2. The stored ad metrics include information for the ads identified at step 301.

The metrics captured by the scanning may be related to coverage, targeting, delivery, quality, and cost. Examples of these metrics include: when the ad was presented (e.g., date and time); ad image (e.g., the actual image presented in the ad); frequency of the occurrence of an ad image in the scan (e.g., two occurrences in 3 scans) based on scan scheduling; hourly/daily detection of the image; where a page including the ad was presented (e.g., URL and page title); a site level hierarchy identifying where the page including the ad is located in the web site; ad location in the web page (e.g., function of the tile parameter being set by DOUBLE-CLICK); click through verification (e.g., checking to make sure the click through works); inappropriate content verifier (make sure ad does not appear next to inappropriate content); and ad matching, which includes checking to see what ad's are shown with others (e.g., is your competitor's ad being shown at the same time as your ad).

KPIs are also derived from the metrics. These KPIs may also be related to coverage, targeting, delivery, quality, and cost. Other metrics and KPIs, which may be beneficial for audit and competitor analysis, may also be captured and determined.

At step 306, reports are generated, for example, by the ABBA server 123 shown in FIG. 2. The reports may be provided via the user interface 124 provided by ABBA. The reports may include audit and competitor analysis reports derived from the metrics and KPIs. Audit reports provide an analysis of whether the client's ads are being posted and whether the ads are being posted in compliance with pre-determined rules, which may be set forth in agreements between ad vendors and the client. An audit report may identify where the ad is posted on a web page or which web page within a web site is posting the ad or whether the ad is being posted next to inappropriate content or a competitor's ad.

The reports may also include competitor analysis, such as the web site and web page within a web site hierarchy where a competitor's ad is posted, the number of ads identified, and other information that is useful for benchmarking the client's ad coverage in relation to the competitor's ad coverage. Examples of reports are provided in FIGS. 5A-C.

Figure 4:
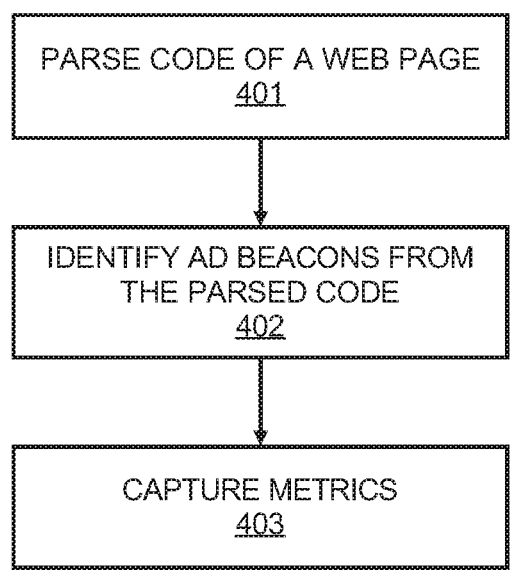
FIG. 4 illustrates a flow chart for scanning, according to an embodiment.

FIG. 4 illustrates a method 400 for scanning web sites for ads to capture ad metrics, according to an embodiment. The method 400 may be performed by ABBA 120 shown in FIG. 2. The method 400 may also be performed by other systems. Also, the method 400 describes scanning a single web page. However, the same scan process is performed for all the web pages that are scanned to capture ad metrics for many web sites. Furthermore, the method 400 describes steps that may be performed at step 304 for the method 300.

At step 401, a scan server parses code of a web page. The scan server, for example, is a server in the scan server cloud 121 shown in FIG. 2. Scanning includes scanning the HTML, any Java scripts, FLASH or other web page code. Iframes are also scanned. Iframes are embedded HTML documents in a web page. Iframes are scanned recursively if an iframe contains another iframe. The HTML and Java script are parsed for each iframe. Parsing includes identifying any code that may be a beacon or ad image. This may including identifying individuals segments of code, such as HTML tags or Java scripts that may potentially include a beacon or an ad image or include a link to an ad. As described above, a beacon, also referred to as a web beacon, is code for a web page that is able to retrieve information from another server. For ads, the beacon may retrieve an ad image.

At step 402, the scan server identifies ad beacons from the parsed code. Regular expression matching against known uniform resource locator (URL) formats used by advertising vendors (e.g., DOUBLECLICK, GOOGLE ADWORDS, etc.) may be used to identify ad beacons.

A beacon may include a regular image expression and a portion of the expression that is unique to the client is identified. For example, a client may use an ad vendor, such as DOUBLECLICK, to post their ads on web sites. The ad vendor puts a beacon in the web site to post the ad. The beacon includes a URL, such as http://m.uk.2mdn.net/viewad/766466/picname300x250.gif_120908.gif.766466 is a unique identifier of the client's ad campaign assigned by the ad vendor and posted in all the beacons for the client. This unique identifier may be pre-determined and stored and associated with the client, for example, in a database, prior to the scanning of the web site. Regular expression matching is used to identify 766466 in the parsed code to find ads for the client. Thus, a portion of a URL in a beacon that identifies the client may be used for matching.

A beacon may include a click thru URL. In this case, the scan server follows and downloads the link in the URL, and continues to follow/download all redirects until a URL is found that doesn't match a beacon regular expression or a click thru URL. This is generally the raw URL of the advertiser's or client's website. The raw URL is stored as the click thru. Also, the matching of advertising images to their corresponding click thru beacon differs based on how the web site has decided to implement their advertising. For example, a click thru beacon may be in code structured as follows:

```
<a href="the click thru url">
<img src="the creative image">
</a>
```

In this case, the matching of the creative image to the click thru url is done based on the structure of the HTML. That is, the beacon is identified by identifying HTML in the web page having this structure, and the ad image is then identified.

In another example, a beacon may be provided in flash code, such as <embedsrc="http://ds.serving-sys.com/ . . . flash.swf?" flashvars=" . . . "/>. In this case, the flash object is parsed and any links generated by the flash are stored.

Most web sites rely on Java script and Flash to deliver ads. Regular expression matching can be used to identify ad images and in particular ad images for the client.

Also, ad beacons are identified for the client as well as for the client's competitors. For example, if a portion of a URL identifies a competitor's name or if a competitors ID used by the ad vendor is known, then those ads are captured by the scan server and used for competitor analysis.

At step 403, metrics for an ad identified from its beacon are captured. The metrics may be determined by identifying the web page posting the ad, determining the hierarchy of the web site, and determining other metrics, for example, from code for the ad.

Figure 5B:
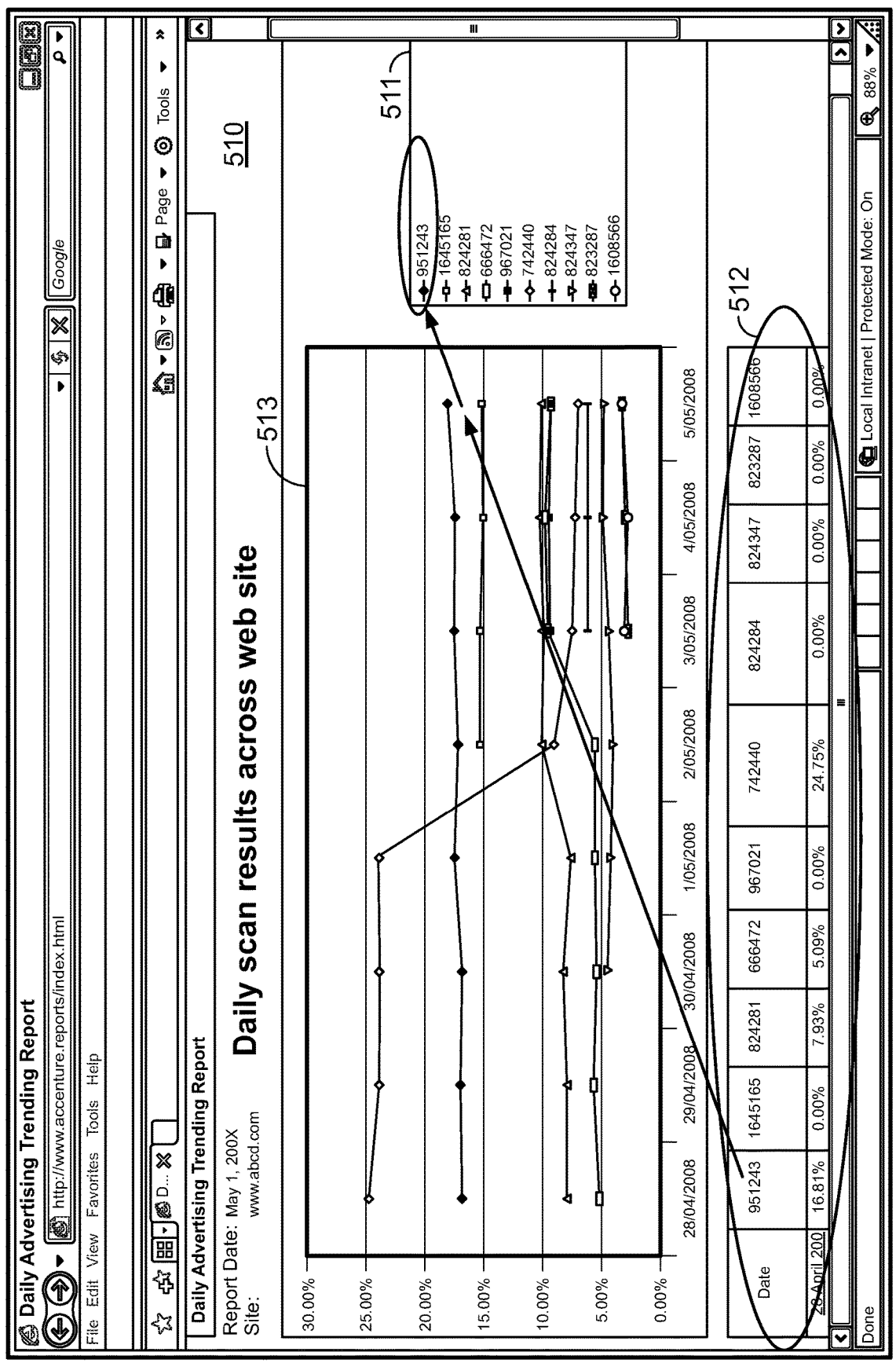

FIGS. 5A-C illustrate sample reports that may be generated by ABBA. FIG. 5A shows a report 500 that provides a snapshot of scan results. The report 500 shows in section 502, the number of pages scanned, the number of images found, the number of images with advertisements and the number of advertisements identified as being client advertisements. The section 503 shows the unique client IDs that may be provided in beacons and are used to identify ads as clients' ads. Each client ID may be selected to view more metrics, such as ad type, page location, etc.

FIG. 5B shows a report 510 illustrating daily scan results for a single web site. The client IDs are shown in section 511. Section 512 shows the percentage of ads on the web site that belong to each client determined from a scan or multiple scans performed on Apr. 28, 2008. Section 513 shows the trend of percentage of ads on the web site that belong to each client over time.

FIG. 5C shows a report 520 illustrating various metrics and KPIs for all campaigns for a particular client. The report shown in FIG. 5A may be provided as part of an audit service for a client to determine information about their ads that are posted on the Internet. The reports 510 may be part of a benchmarking/competitor analysis, that can be used by a client to compare their ad coverage to competitors' ad coverages. The report 520 is a summary report for all the client's campaigns. The metrics and KPIs shown in the report 520 are related to costs, coverage, targeting, attention, and delivery.

Figure 6:
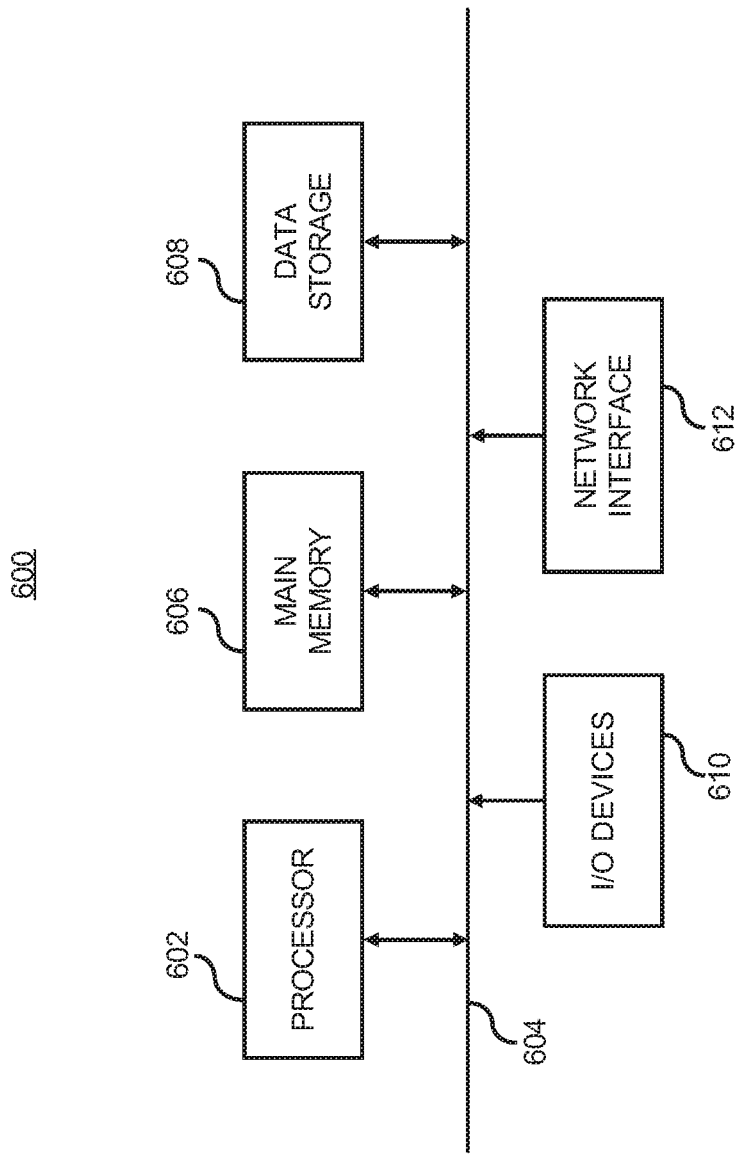
FIG. 6 illustrates a computer system that may be used for the methods and systems, according to an embodiment.

FIG. 6 shows a computer system 600 that may be used with the embodiments described herein. The computer system 600 represents a generic platform that includes components that may be in a server or other computer system. The computer system 600 may be used as a platform for executing one or more of the methods, functions, and other steps described herein. These steps may be embodied as software stored on one or more computer readable mediums. Furthermore, the computer system may be a scanning computer system that is a scan server in the scan server cloud 121 shown in FIG. 2. The computer system 600 may be a computer system performing the functions of ABBA 120 shown in FIG. 2.

The computer system 600 includes a processor 602 that may implement or execute software instructions performing some or all of the methods, functions, and other steps described herein. Commands and data from the processor 602 are communicated over a communication bus 604. The computer system 600 also includes a main memory 606, such as a random access memory (RAM), where the software and data for processor 602 may reside during runtime, and a secondary data storage 608, which may be non-volatile and stores software and data. The memory and data storage are examples of computer readable mediums.

The computer system 600 may include one or more I/O devices 610, such as a keyboard, a mouse, a display, etc. The computer system 600 may include a network interface 612 for connecting to a network. It will be apparent to one of ordinary skill in the art that other known electronic components may be added or substituted in the computer system 600.

One or more of the steps of the methods described herein and other steps described herein and one or more of the components of the systems described herein may be implemented as computer code stored on a computer readable medium, such as the memory and/or secondary storage, and executed on a computer system, for example, by a processor, application-specific integrated circuit (ASIC), or other controller. The code may exist as software program(s) comprised of program instructions in source code, object code, executable code or other formats. Examples of computer readable medium include conventional computer system RAM (random access memory), ROM (read only memory), EPROM (erasable, programmable ROM), EEPROM (electrically erasable, programmable ROM), hard drives, and flash memory.

While the embodiments have been described with reference to examples, those skilled in the art will be able to make various modifications to the described embodiments without departing from the scope of the claimed embodiments.

What is claimed is:

1. A system comprising:
    a processor;
    a memory storing machine readable instructions that when executed by the processor cause the processor to:
        scan, by a plurality of scan servers located at different geographical locations, a plurality of web sites based on a competitor analysis of a set of competitors of a client;
        detect web pages based on the scanning of the plurality of web sites;
        parse the web pages of the plurality of web sites;
        identify ad beacons from the parsed web pages;
        determine, based on an analysis of information that describes online ads for the client and an analysis of the ad beacons, whether the ad beacons identify the online ads for the client;
        determine metrics for the online ads for the client identified by the ad beacons;
        determine delivery quality of the identified online ads from a set of the metrics by analyzing, from the set of the metrics, frequency of an occurrence of specified content in the identified online ads based on a specified scan frequency that corresponds to the specified content;
        determine key performance indicators (KPIs) from the metrics, wherein the KPIs are configured to determine effectiveness of ads relative to content and web sites;
        perform a cost analysis for the identified online ads, by analyzing, from the KPIs, actual placement that includes an actual vertical and horizontal placement location of the identified online ads on a web page and relative to the web page, versus planned placement that includes a planned vertical and horizontal placement location of the identified online ads on the web page and relative to the web page;
        modify, based on the determined delivery quality of the identified online ads and the KPIs, a number of the identified online ads for at least one of the web pages by
            modifying, by at least one scan server of the plurality of scan servers, the number of the identified online ads to modify the at least one of the web pages to increase or decrease the number of the identified online ads; and
    a network interface to communicate with web servers hosting the plurality of web sites operable to include the online ads for the client.

2. The system according to claim 1, further comprising machine readable instructions that when executed by the processor further cause the processor to:
    utilize the information that describes the online ads for the client to distinguish the online ads for the client or the client's competitors from other online ads.

3. The system according to claim 1, further comprising machine readable instructions that when executed by the processor further cause the processor to:
    determine, based on the information, whether the ad beacons identify the online ads for the client by comparing a unique client ID to an ad beacon URL.

4. The system according to claim 1, further comprising machine readable instructions that when executed by the processor further cause the processor to:
    generate a display of attributes for the identified online ads for the client and for competitor ads, the metrics for the identified online ads for the client and for the competitors ads, and the KPIs; and
    implement, in the generated display, dynamic searching of advertising statistics, and selected KPIs.

5. The system according to claim 1, wherein the machine readable instructions to scan the plurality of web sites, further comprise machine readable instructions that when executed by the processor further cause the processor to:
    scan the plurality of web sites based on a region-based scan for online ad information.

6. The system according to claim 1, further comprising machine readable instructions that when executed by the processor further cause the processor to:
    generate a competitor analysis report based on the competitor analysis, wherein the competitor analysis report is generated by analyzing metrics for competitors to identify which competitors are advertising and where and how often the competitors are advertising.

7. The system according to claim 1, further comprising machine readable instructions that when executed by the processor further cause the processor to:
    determine whether an identified ad beacon of the identified ad beacons includes a click thru URL.

8. The system according to claim 7, further comprising machine readable instructions that when executed by the processor further cause the processor to:
    follow the click thru URL until a URL is found that does not match an ad beacon or a click thru URL; and
    store the metrics for each click thru URL or ad beacon identified when following the click thru URL.

9. The system according to claim 1, further comprising machine readable instructions that when executed by the processor further cause the processor to:
    determine a location on the at least one of the plurality of web sites to increase or decrease the number of the client's ads.

10. A computer implemented method comprising:
    scanning, by a plurality of scan servers located at different geographical locations, a plurality of web sites;
    detecting web pages based on the scanning of the plurality of web sites;
    parsing the web pages of the plurality of web sites;
    identifying ad beacons from the parsed web pages;

determining, based on an analysis of information that describes online ads for a client, whether the ad beacons identify the online ads for the client;

determining, by a processor, metrics for the identified online ads for the client;

determining key performance indicators (KPIs) which identify effectiveness of ads relative to content and web sites;

performing a cost analysis for the identified online ads, by analyzing, from the KPIs, actual placement that includes an actual vertical and horizontal placement location of the identified online ads on a web page and relative to the web page, versus planned placement that includes a planned vertical and horizontal placement location of the identified online ads on the web page and relative to the web page; and determining, based on the KPIs and an analysis of locations of the web pages in their web site hierarchies for websites of the plurality of web sites that include at least three web pages, and the web pages according to their locations in their web site hierarchies, a location on the at least one of the plurality of web sites to increase or decrease, for at least one of the web pages, a number of the identified online ads for the client by modifying, by at least one scan server of the plurality of scan servers, the number of the identified online ads to modify the at least one of the web pages to increase or decrease the number of the identified online ads.

11. The computer implemented method of claim 10, wherein the information comprises information unique to the client or the client's competitors, further comprising:

analyzing the information to distinguish the online ads of the client or the client's competitors from other online ads.

12. The computer implemented method of claim 10, further comprising:

determining, based on the information, whether the ad beacons identify the online ads for the client by comparing a unique client ID to an ad beacon URL.

13. The computer implemented method of claim 10, further comprising:

generating reports including the KPIs, wherein the reports include a competitor analysis report which is generated by analyzing the metrics for the client's competitors to identify which competitors are advertising and where and how often the competitors are advertising.

14. A non-transitory computer readable medium having stored thereon machine readable instructions, the machine readable instructions, when executed, cause a processor to:

retrieve information describing online ads from data storage;

scan, by a plurality of scan servers located at different geographical locations, web sites hosted on web servers based on a region-based scan for the online ads using the information;

identify the online ads based on the scanning of the web sites;

determine metrics for the identified online ads;

determine key performance indicators (KPIs) from the metrics, wherein the KPIs are configured to determine effectiveness of ads relative to content and web sites;

perform a cost analysis for the identified online ads, by analyzing, from the KPIs, actual placement of the identified online ads versus planned placement of the identified online ads; and modify, based on the KPIs, at least one of the web sites to increase or decrease a number of the identified online ads by modifying, by at least one scan server of the plurality of scan servers, the number of the identified online ads to modify at least one web page to increase or decrease the number of the identified online ads.

15. The non-transitory computer readable medium according to claim 14, wherein the machine readable instructions to retrieve information from data storage further comprise machine readable instructions that when executed further cause the processor to:

retrieve, from ad beacons for online ads posted on the web sites, information that describes the online ads for at least one of a client and one or more of the client's competitors.

16. The non-transitory computer readable medium according to claim 14, wherein the machine readable instructions to scan web sites hosted on web servers based on the region-based scan for the online ads using the information to identify the online ads further comprise machine readable instructions that when executed further cause the processor to:

parse web pages of the web sites;

identify ad beacons based on the parsing of the web pages of the web sites; and determine whether any identified ad beacons include information that describes the online ads for at least one of a client and one or more of the client's competitors.

17. The non-transitory computer readable medium according to claim 14, wherein the machine readable instructions, when executed, further cause the processor to:

categorize the metrics and the KPIs in one or more categories comprising coverage, targeting, delivery quality, and cost.

18. The non-transitory computer readable medium according to claim 14, wherein the machine readable instructions, when executed, further cause the processor to:

determine delivery quality of the identified online ads from a set of the metrics by analyzing, from the set of the metrics, frequency of an occurrence of content in the identified online ads based on scan frequency.

19. The non-transitory computer readable medium according to claim 14, wherein the machine readable instructions, when executed, further cause the processor to:

determine a cost analysis for the identified online ads from the KPIs, by analyzing, from the KPIs, cost per click, cost per page and page location, and depth versus breadth scan.

20. The non-transitory computer readable medium according to claim 14, wherein the machine readable instructions to perform the cost analysis for the identified online ads, by analyzing, from the KPIs, actual placement of the identified online ads versus planned placement of the identified online ads, when executed, further cause the processor to:

perform the cost analysis for the identified online ads, by analyzing, from the KPIs, the actual placement that includes an actual placement location of the identified online ads on a web page versus the planned placement that includes a planned placement location of the identified online ads on the web page.

* * * * *